United States Patent

Nagae et al.

[15] 3,703,115
[45] Nov. 21, 1972

[54] AUTOMATIC GLASS RIBBON CUTTING PROCESS AND APPARATUS

[72] Inventors: Yasuyuki Nagae, 40-12 Ohmino; Nobuyuki Yamashita, 2095 Miyaziono-cho Sanban, both of Sakai, Japan

[22] Filed: Sept. 8, 1970

[21] Appl. No.: 70,214

[30] Foreign Application Priority Data

Sept. 10, 1969 Japan ......................44/71271

[52] U.S. Cl. ..............................83/12, 83/295
[51] Int. Cl. ............................B26d 3/08
[58] Field of Search..................83/6, 7, 10–12, 83/295

[56] References Cited

UNITED STATES PATENTS 3,198,044  8/1965  Clin..........................83/12 X
3,165,017  1/1965  Galabert.....................83/6 X
3,499,354  3/1970  Layman......................83/11

*Primary Examiner*—James M. Meister
*Attorney*—Bucknam and Archer

[57] ABSTRACT

A process and apparatus for continuously cutting or scoring a moving glass ribbon in which a cutter mechanism having a cutter means mounted thereon for movement with and also transversely of said cutter mechanism is driven across said glass ribbon at substantially right angles to the ribbon from one position to the other position and simultaneously, said cutter means is driven in the same direction and at the same velocity as said glass ribbon, said cutter mechanism is retained in said other position while said cutter means is being driven in a direction opposite to said first-mentioned direction to its initial position and upon returning of said cutter means to said initial position said cutter mechanism is driven from said other position to said one position and simultaneously.

10 Claims, 4 Drawing Figures

PATENTED NOV 21 1972

AUTOMATIC GLASS RIBBON CUTTING PROCESS AND APPARATUS

BACKGROUND OF THE INVENTION

In any of the conventional continuous glass production systems molten glass from a glass melting furnace is passed between oppositely disposed rolls to be formed into a continuous glass ribbon having a given width and a given thickness and the glass ribbon is then fed onto a conveyor to be conveyed thereon to a destination point in the system while being allowed to cool. In order to cross-cut or score the glass ribbon at predetermined space intervals while the glass ribbon is cooling and while it is being conveyed on the conveyor, an automatic glass cutting device is provided at suitable points in the path of the glass ribbon.

In one of the conventional automatic glass cutting devices, generally, a guide rail is provided at a suitable point above and along the path of the glass ribbon at an angle with respect to the advancing direction of the glass ribbon and a cutter mechanism is provided so as to be slidably moved along the guide rail intersecting the glass ribbon advancing direction to cross-cut or score the glass ribbon. When it is assumed that the advancing velocity of the glass ribbon is V, the angle (inclination angle) of the axis of the guide rail with respect to the advancing direction of the glass ribbon is $\theta$ and the moving velocity of the cutter mechanism as the cutter mechanism moves across the glass ribbon to cross-cut or score the glass ribbon is $v$, the velocity of the cutter mechanism should be controlled so as to always satisfy the relationship such as $v = V/\sin \theta$. And after one cross-cutting operation by the cutter mechanism on the glass ribbon in the movement mentioned above, it is necessary that the cutter mechanism be precisely returned to its initial position prior to the next cross-cutting operation.

However, it has been found that the above type of conventional glass production system inherently has various technological disadvantages in meeting recent demands in the glass manufacturing field such as preciseness in cross-cutting and high speed production. For example, in one of the conventional glass production systems, the cutter mechanism cross-cuts or scores the glass ribbon only once as the cutter mechanism traverses the glass ribbon in a single reciprocal movement and therefore, in order to increase the glass production rate the cutter mechanism must be reciprocated across the glass ribbon at an increased velocity. However, if the velocity of the reciprocal movement of the cutter mechanism is substantially increased the cut faces of glass products cut off the continuous glass ribbon will be proportionally irregular the quality of such products will be inferior and therefore, an increase in the velocity of the cutter mechanism is not desirable. On the other hand, in order to produce glass products having satisfactory cut faces, if the velocity of the reciprocal movement of the cutter mechanism is reduced, as it is clear from the equation $v = V/\sin \theta$ in the conventional system it is necessary to make the value of $\sin \theta$ larger which in turns necessitates to increase the angle of the axis of the guide rail with respect to the advancing direction of the glass ribbon. The size of glass products obtained by the system would be inevitably large and the system can not be satisfactorily operated to produce small size glass products. Furthermore, in the conventional glass production system, the velocity of the cutter mechanism must be controlled so as to satisfy the equation $v = V/\sin \theta$ and accordingly, the construction of an electric control system which controls the velocity of the cutter mechanism will be inevitably complicated and the system will be expensive.

SUMMARY OF THE INVENTION

The principal object of the present invention is to provide a process and an apparatus for automatically cutting or scoring a continuous moving glass ribbon which can effectively eliminate the disadvantages inherent in the conventional glass cutting systems referred to above and which enhance preciseness in cutting and production rate whereby various sizes of glass products can be efficiently obtained from the glass ribbon.

Another object of the present invention is to provide an automatic glass cutting apparatus in which a cutter mechanism on which a cutter means is mounted for movement with and also transeversely of the cutter mechanism to cross-cut or score a glass ribbon is adapted to be reciprocally and slidably moved along a guide rail which is disposed above a moving conveyor on which said glass ribbon is being conveyed with the axis of the rail intersecting the axis of said conveyor at substantially right angles thereto.

Another object of the present invention is to provide an automatic glass cutting process and apparatus in which as soon as said cutter mechanism initiates its movement in one direction along said guide rail said cutter means mounted thereon moves in the advancing direction of said glass ribbon at the same velocity as the glass ribbon whereby the cutter means contacts the glass ribbon in a substantially stationary state to cross-cut or score the glass ribbon.

Another object of the present invention is to provide an automatic glass cutting process and apparatus in which the velocity at which said cutter mechanism slidably moves along said guide rail can be easily set to a value most suitable for effecting the cross-cutting or scoring on said glass ribbon independently of the advancing velocity of the glass ribbon.

Another object of the present invention is to provide an automatic glass cutting process and apparatus in which while said cutter mechanism slidably moves along said guide rail in a single reciprocal movement the cross-cutting or scoring operation can be effected on said glass ribbon two times.

According to the present invention, as soon as said cutter mechanism initiates its movement along said guide rail from one end to the other end of the rail said cutter means mounted on the cutter mechanism initiates its movement in the advancing direction of said moving glass ribbon at the same velocity as the glass ribbon and when the movement of said cutter mechanism terminates upon the completion of one cross-cutting or scoring by the cutter means on the glass ribbon the movement of the cutter mechanism terminates. In this manner, the cutter means moves in the opposite direction back to its initial position at a higher velocity than that at which the cutter means moves in the advancing direction of the glass ribbon.

The mechanical components of the automatic glass cutting apparatus of the present invention generally include a guide rail disposed above a roller conveyor on which a glass ribbon is continuously conveyed with the axis of said rail intersecting the axis of the conveyor at substantially right angles to the latter; a cutter mechanism adapted to slidably and reciprocally move along said guide rail and having a cutter means mounted thereon for movement with and also transversely of the cutter mechanism; an electric motor for driving said cutter mechanism; a mechanism associated with said cutter means including a pair of guide bars for guiding said cutter means as the cutter means moves transversely of said cutter mechanism in the advancing direction of said glass ribbon and the opposite direction and an electrical pulse motor for driving said cutter means in said glass ribbon advancing direction at the same velocity as the ribbon and in said opposite direction at a higher velocity; and a pulse signal generator for detecting the advancing velocity of said glass ribbon and converting said detected advancing velocity into pulse signals.

The automatic control system which electrically controls the moving mechanical components of the glass cutting apparatus includes a preset counter for counting the number of said pulse signals from said pulse signal generator and for generating an instruction signal when the number of the pulse signals reaches a predetermined value; an electric motor control circuit adapted to rotate said electric motor which drives said cutter mechanism in one or the other direction upon application of said instruction signal to said control circuit whereby the cutter mechanism is moved along said guide rail from one end to the other end of the guide rail or vice versa: and an electrical pulse motor control circuit adapted to be actuated upon application of said instruction signal thereto to apply said pulse signals to an electrical pulse motor so as to rotate the pulse motor in the forward direction thereby to drive said cutter means in said advancing direction of said glass ribbon at the same velocity as the ribbon and thereafter to apply reverse direction rotation pulse signals from another pulse signal generating means to said pulse motor to rotate the pulse motor in the reverse direction so as to return the cutter means to its initial position. The actuation of the automatic control system is effected by closing an actuating switch in a gate circuit disposed between the pulse signal generator and preset counter.

In the control mechanism referred to above, when the electric motor control circuit is energized upon application thereto an instruction signal from the preset counter to drive the cutter mechanism alon the guide rail from one end to the other end of the latter and simultaneously, the electric motor control circuit is energized to drive the cutter means in the advancing direction of the glass ribbon at the same velocity as the ribbon so as to cross-cut or score the glass ribbon. After one cross-cutting operation has been completed by the cutter means, the cutter means is allowed to return to its initial position at a velocity higher than at which the cutter means is driven in the glass ribbon advancing direction while the cutter mechanism is retained in the position where the previous cross-cutting operation was terminated. Thereafter, when a next instruction signal is applied to the preset counter, the cutter mechanism is moved along the guide rail in the direction opposite to the previous direction and simultaneously, the cutter means is driven in the advancing direction of the glass ribbon at the same velocity as the glass ribbon so to cross-cut or score the glass ribbon.

According to the present invention, when the cross-cutting or scoring operation is effected, the cutter means always moves in the advancing direction of the glass ribbon at the same velocity as the ribbon and accordingly, the cutter means contacts and cross-cuts or scores the glass ribbon in a substantially stationary state. Therefore, the movement velocity of the cutter mechanism can be selected independend of the advancing velocity of the glass ribbon which makes it easy to set the movement velocity of the cutter mechanism to a value most suitable for a particular glass cross-cutting operation resulting in improvement of cutting preciseness over that by the conventional glass cutting systems. Since the movement velocity of the cutter mechanism can be selected independently of the advancing velocity of the glass ribbon, as compared with the conventional glass cutting systems in which the relationship between the movement velocity of the cutter mechanism $v$ and the advancing velocity of the glass ribbon V must be so selected that the equation $v = V/\sin \theta$ is always satisfied, the construction of the glass cutting apparatus including the electrical control system can be greatly simplified.

Furthermore, according to the present invention, as the cutter mechanism reciprocates one time along the guide rail from one to the other end and vice versa, the glass cross-cutting operation can be effected two times and accordingly, the glass cutting operation in the novel apparatus is effected at a higher rate as compared with conventional glass cutting systems in which one reciprocal movement of the cutter mechanism along the guide rail effects only one glass cross-cutting operation. In addition, according to the present invention, glass products of a great variety of sizes including very small sizes can be efficiently produced.

The above and other objects and attendant advantages of the present invention will be more readily apparent to those skilled in the art from a reading of the following description of the invention referring to the accompanying drawings.

BRIEF DESCRIPTION OF THE INVENTION

PREFERRED EMBODIMENT OF THE INVENTION

Figure 1:
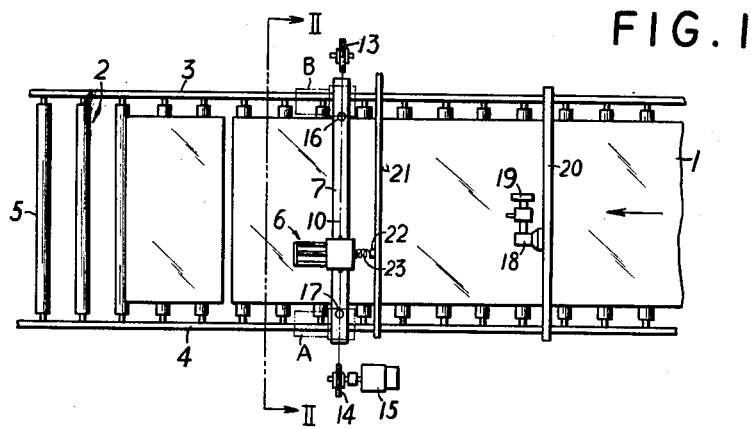
FIG. 1 is a fragmentary top plan view of essential mechanical components of a preferred embodiment of apparatus for automatically cutting a glass ribbon according to the present invention.
Figure 2:
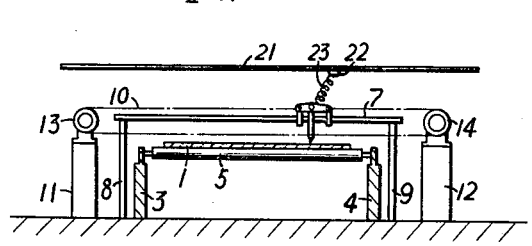
FIG. 2 is a cross-sectional view taken along substantially the line II—II of FIG. 1 showing said mechanical components in elevation.

Referring to the accompanying drawings and more particularly, to FIGS. 1 and 2 thereof, a glass ribbon 1 having a given width and a given thickness is continuously supplied into the automatic cutting apparatus of the invention at the inlet end thereof (not shown) and fed onto a roller conveyor 2 which comprises a plurality of spaced and parallel rollers 5 which are rotatably supported at the opposite ends in a pair of opposite and spaced frame members 3 and 4 provided adjacent to and extending along the path of the glass ribbon on the opposite sides of the latter. The rollers 5 are adapted to be rotated by the advancing glass ribbon 1 thereon which frictionally engages the rollers as the ribbon advances in the path in the arrow direction (FIG. 1). A cutter mechanism 6 which is adapted to transversely cut or score the glass ribbon 1 is slidably supported on a guide rail 7 which is in turn fixedly supported on the opposite frame members 3 and 4 above the conveyor 2 with the axis of the rail intersecting the axis of the conveyor 2 and accordingly, the advancing direction of the glass ribbon 1. The guide rail 7 is supported at the opposite ends on a pair of upright support columns 8 and 9 disposed on and outwardly spaced from the opposite sides of the conveyor 2 and extending to a height above the conveyor. Secured to the cutter mechanism 6 is an endless rope 10 under tension which extends in parallel to the guide rail 7 so that the cutter mechanism 6 may be slidably moved along the guide rail 7. The endless rope 10 is trained over a pair of sheaves 13 and 14 which are in turn supported on another pair of upright support columns 11 and 12 disposed adjacent to and spaced outwardly of the first pair of support columns 8 and 9, respectively. One of the rope sheaves 13 and 14 is a drive sheave and the other sheave is a driven sheave in the illustrated embodiment and the drive shaft of the sheave (not shown) is connected to an electric motor 15 which is a reversible motor and as the motor is rotated in one or the other direction the cutter mechanism 6 is slidably moved along the guide rail 7 in the advancing or retracting direction across the conveyor 2. A pair of microswitches 16 and 17 are provided on the guide rail 7 at points adjacent to the opposite ends thereof, respectively and each of the microswitches is adapted to close its contact as the cutter mechanism 6 which is sliding along the guide rail 7 reaches either one of points A and B which lie adjacent the opposite side edges of the moving glass ribbon 1. In this manner, a signal to a control mechanism is sent which will be described hereinafter. The advancing velocity of the glass ribbon 1 is detected by a conventional pulse signal generator 18 which is one of those which are conventionally employed in the type of glass cutting apparatus to which the present invention directs. In the illustrated embodiment of apparatus, the pulse signal generator 18 is shown as being connected to a hard rubber detection roller 19. The generator is supported on a support bar 20 which is in turn fixedly supported at the opposite ends on the opposite frame members 3 and 4 at the upstream of the guide rail 7 in the path of the glass ribbon 1 extending above and intersecting the conveyor 2. The detection roller 19 is adapted to be rotated by the advancing glass ribbon 1 the top surface of which is in frictional contact with the roller. The rotation of the detection roller 19 generates a pulse signal which represents the advancing velocity of the glass ribbon 1.

As will be in detail described hereinafter, the cutter mechanism 6 comprises a cutter means which is adapted to cut or score the glass ribbon 1 transversely thereof and an electrical pulse motor for moving the cutter means in the same direction and velocity as the moving glass ribbon 1. The electrical pulse motor 19 is driven in response to a pulse signal which is supplied from an automatic electric control system which will be described hereinafter through a power supply means which comprises a cable guide rail 21 disposed spacedly between the guide rail 7 and support bar 20 and supported at a position higher than the rail 7 and bar 20 by means of suitable support means (not shown) and a cable 23 connected to the cutter mechanism 6 and having a slidable contact 22 adapted to contact the cable guide rail 21.

Figure 3:
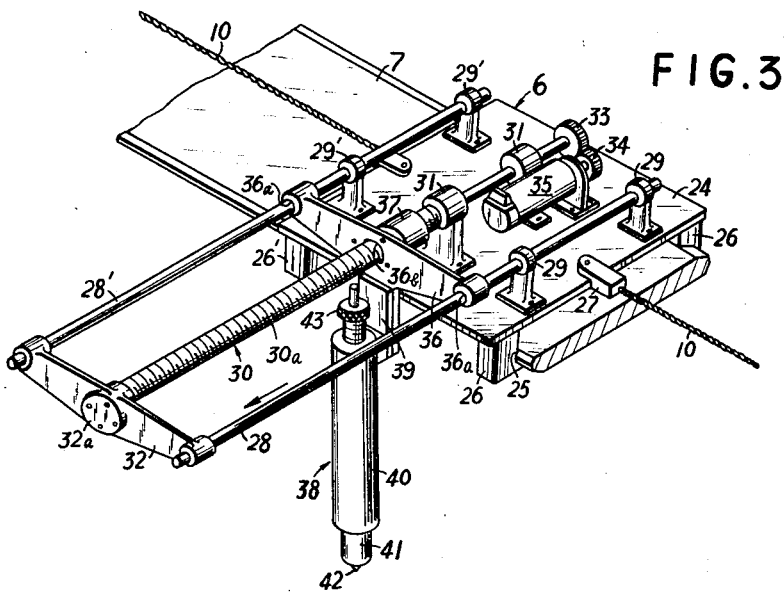
FIG. 3 is a perspective view on an enlarged scale showing the cutter mechanism and its associated drive mechanism of said apparatus as shown in FIG. 1.

FIG. 3 shows the construction of the cutter mechanism 6 and as shown in this Figure, the cutter mechanism comprises a carriage 24 from the underside of which two pairs of legs 26, 26 and 26', 26' depend at four corners thereof. One pair of the legs 26 and 26 are provided on their opposite sides with V-shaped notches 25 and similarly, the opposite sides of the other pair of legs 26' and 26' are provided with notches 25 (not shown) for receiving the opposite side edges of the guide rail 7 whereby the cutter mechanism 6 can slidably move bodily along the guide rail. The opposite ends of the endless cable 10 are secured to the opposite ends of the carriage 24 by means of suitable anchoring means 27, respectively. The upper surface of the carriage 24 supports a pair of parallel and spaced guide bars 28 and 28' by means of two pairs of support brackets 29 and 29', respectively, which are in turn secured at the lower ends to the carriage and extend uprightly from the top surface of the carriage. In the illustrated embodiment, the guide bar 28 is supported in two spaced brackets 29 at spaced points adjacent to one end while the guide bar 28' is supported at spaced points adjacent to one end in two spaced brackets 29'. The guide bars are parallel to each other and parallel to the advancing path of the glass ribbon 1 or at right angles to the guide rail 7. The other ends of the parallel guide bars 28 and 28' extend beyond the adjacent side edge of the carriage 24. A ball screw 30 extends between the guide bars 28 and 28' parallel to and spaced from the guide bars and is rotatably supported in its non-threaded portion at different points in spaced bearings 31 and 31 which are in turn supported on the carriage 24. An electrical pulse motor 35 is supported on the carriage 24 by suitable means adjacent and parallel to the non-threaded end portion of the ball screw 30 and accordingly, to the guide bars 28 and 28' and the motor 35 is adapted to drive the ball screw. The threaded end portion of the ball screw 30 which extends beyond the adjacent side edge of the guide rail 7 is rotatably supported in a cross bar 32 in the hollow cylindrical center portion 32a thereof which cross bar connects the extreme ends of the threaded ends portions of the guide bars 28 and 28' together. The extreme end of the non-threaded end portion of the ball screw 30 has a gear 33 secured thereto for meshing with a pinion gear 34 secured to the exposed end of the output shaft of the pulse motor 35.

A T-shaped movable arm member 36 extends across the guide bars 28 and 28' and ball screw 30 and has through holes 36a and 36a at the opposite ends of the transverse portion of the arm member through which the guide bars 28 and 28' extend loosely and a through hole 36b in the center of the transverse portion thereof through which the ball screw 30 extends. A ball nut 37 is threaded on the threaded portion of the ball screw 30 between the arm member and the bearings 31. Thus, as the electrical pulse motor 35 is rotated in the forward direction, the ball screw 30 is also rotated in the forward direction so as to move the movable arm member 36 in the arrow direction. On the other hand, as the pulse motor 35 is rotated in the reverse direction, the ball screw 30 is also rotated in the reverse direction so as to move the arm member 36 in the direction opposite to the arrow direction to the initial position.

The cutter means 38 comprises an outer sleeve 40 having a support member 39 secured to the upper end thereof for attaching the cutter means to the movable arm member 36, a slidable wheel holder 41 telescopically received in the sleeve 40 and normally urged downwardly by a coiled spring received in the sleeve (not shown) and a cutting wheel 42 rotatably supported at the lower exposed end of the wheel holder 41. As it is well known in the art, the force of the coiled spring which urges the wheel holder 41 downwardly can be adjusted by means of an adjusting nut 43 threaded into the upper and portion of the sleeve 40 so that the cutting wheel 42 may contact the glass ribbon with a constant force.

The prinicle of the present invention in which a moving glass ribbon 1 is cut or scored in a transverse direction at right angles to the advancing direction of the glass ribbon will be described referring to FIGS. 1 through 3 of the accompanying drawings.

When it is assumed that the advancing velocity of the glass ribbon 1 is V, the diameter of the detection roller 19 is D and the number of pulses to be generated from the pulse generator 18 per complete revolution of the detection roller is P, then the number of complete revolution of the detection roller 19 per unit time $n$ will be $n = V/\pi D$ and the number of pulses to be generated from the pulse generator 18 per unit time or pulse generation frequency $f$ will be $$f = PV/\pi D \quad (1)$$

In other words, when the diameter D of the detection roller and the pulse generation number P per complete revolution of the detection roller are once determined, the advancing velocity V of the glass ribbon can be determined as a function of the pulse frequency $f$.

On the other hand, since the advancing distance of the glass ribbon is D per complete revolution of the detection roller 19 and the pulse generation number per complete revolution of the detection roller 19 is P, the advancing distance L of the glass ribbon per pulse will be $L = \pi D/P$ In other words, when the diameter of the detection roller 19 is once determined, the advancing distance of the glass ribbon can be determined by counting the number of pulses.

Now, assuming that the electrical pulse motor 35 mounted on the cutter mechanism 16 would rotate by a given angle $\theta$ in the forward direction for a particular input pulse, when the electrical pulse motor is applied thereto a pulse having the frequency $f$, the electrical pulse motor will be rotated in the normal direction in the following velocity per unit time:

$$N = \theta f/360 \quad (2)$$

When the electrical pulse motor 35 is rotated, the rotation of the motor rotates the ball screw 30 via the pinion gear 34 and gear 33 which in turn advances the ball nut 37 and movable arm member 36 on the ball screw 30 in the arrow direction along the guide bars 28 and 28'. Therefore, when the pitch of the ball screw 30 is defined as L, the cutter means 38 supported by the movable arm 36 will advance by the distance L in the advancing direction of the glass ribbon each time the ball screw 30 makes a complete revolution. In such a case, if it is assumed that the number of the teeth on the pinion gear 34 is $n_1$ and the number of the teeth on the gear 33 is $n_2$, then the advancing distance L' of the cutter means 38 in the advancing direction of the glass ribbon each time the electrical pulse motor 35 makes a complete revolution will be:

$$L' = n_1 L/n_2$$

However, when the advancing velocity of the glass ribbon 1 is V the pulse generation frequency $f$ of the pulse generator is expressed by the Equation (1) and the number of rotation N of the electrical pulse motor per unit time is expressed by the Equation (2) and therefore, $$N = (PV/\pi D) \cdot (\theta/360)$$

Accordingly, the advancing distance of the cutter means 38 in the advancing direction of the glass ribbon per unit time or the advancing velocity $v$ will be expressed by the following equation:

$$v = (n_1/n_2) \cdot L \cdot (PV/\pi D) \cdot (\theta/360) \quad (3)$$

However, in order that the cutter mechanism 16 slide along the guide rail 7 as driven by the electric motor 15 to cut or score the glass ribbon 1 in a direction at right angles to the advancing direction of the glass ribbon 1, it is necessary that the advancing velocity of the cutter means 38 along the guide bars 28 and 28' or $v$ be equal to the advancing velocity of the glass ribbon 1 or V. And when it is assumed that $v = V$ in the equation (3), the following equation will be obtained:

$$(n_1/n_2) \cdot L \cdot (P/\pi D) \cdot (\theta/360) = 1 \quad (4)$$

In other words, when $n_2$L, P, D and $\theta$ are so set that the Equation (4) may be satisfied, the advancing velocity of the cutter means 38 in the advancing direction of the glass ribbon 1 along the guide bars $a8$ and $a8'$ or $v$ can be made always equal to the advancing velocity of the glass ribbon or V independent of the sliding velocity of the cutter mechanism 6 along the guide rail 7. This means that the glass ribbon and the cutter means 38 contact with each other in a substantially stationary state. Accordingly, when the cutter mechanism 6 slides along the guide rail 7 the axis of which is disposed at substantially right angles with respect to the advancing direction of the glass ribbon 1 the cutter mechanism can cut or score the moving glass ribbon 1 precisely at substantially right angles to the advancing direction of the ribbon. In such a case, the rotational speed of the electric motor 15 is preferably so set that the cutter mechanism 6 is driven by the motor to make a precise score across the glass ribbon independently of the advancing velocity of the glass ribbon.

Figure 4:
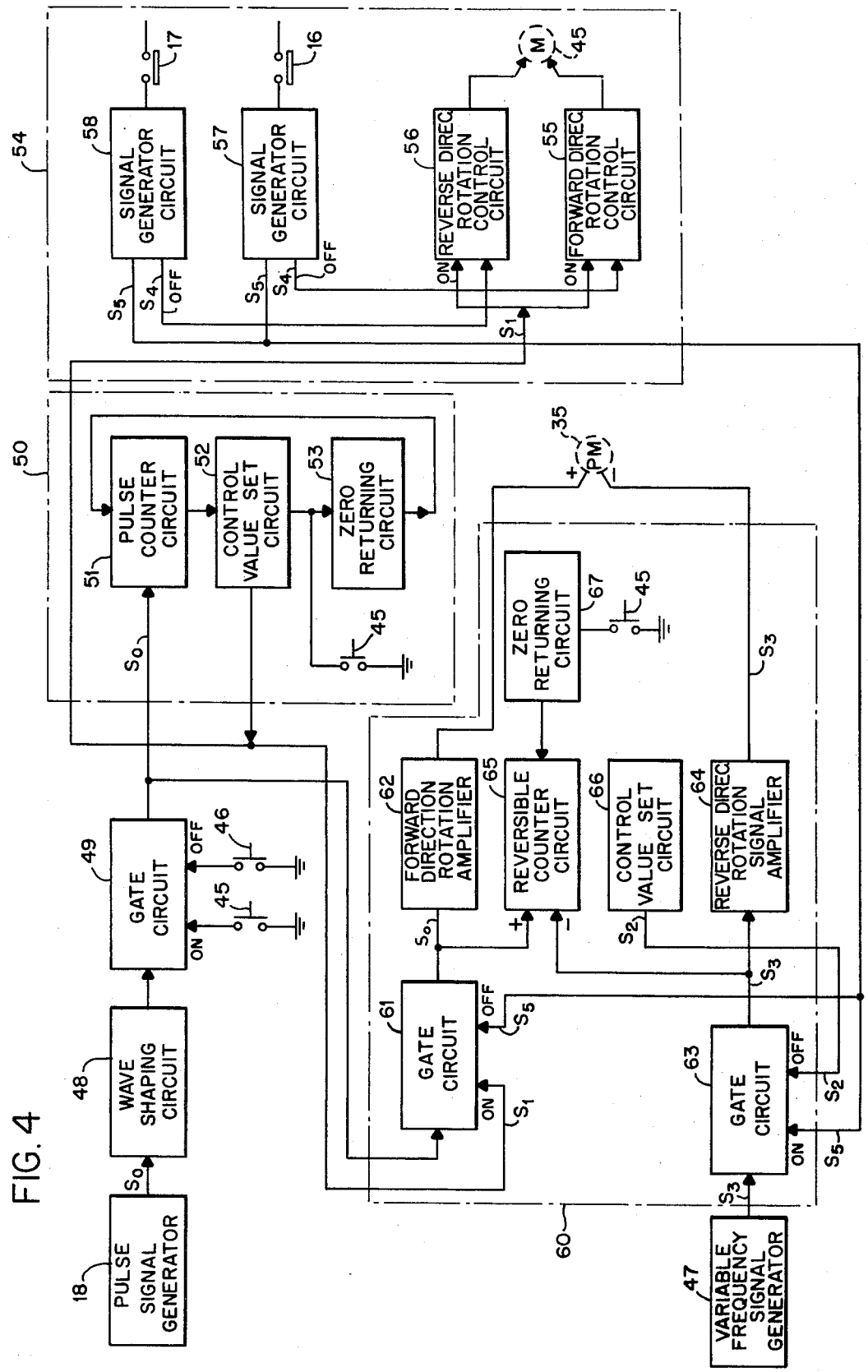
FIG. 4 is a diagram of the automatic electrical control system employed in said apparatus as shown in FIG. 1.

FIG. 4 illustrates one embodiment of automatic control system which electrically controls the operation of the moving mechanical components of the apparatus shown in FIGS. 1 through 3. In FIG. 4, an actuating switch and stop switch are shown with reference numerals 45 and 46, respectively. A signal generation source which rotates the electrical pulse motor 35 in the reverse direction is shown in the form of a variable frequency signal generator 47.

The automatic control mechanism of FIG. 4 includes a wave shaping circuit 48 adapted to shape the wave form of pulse signals $S_o$ representing the advancing velocity of the moving glass ribbon detected by the pulse generator 18, a gate circuit 49 adapted to pass the shaped pulse signals through the closed circuit of the actuating switch 45, a preset counter adapted to count the number of succesive pulse signals and to generate and instruction signal $S_1$ when the number of such pulses reaches a predetermined value. The control mechanism also comprises an electric motor control circuit 54 adapted to rotate the electric motor 15 in the forward or reverse direction depending upon the instruction signal $S_1$ so as to move the cutter mechanism 6 in one or the other direction along the guide rail 7 and an electrical pulse motor control circuit 60 adapted to actuate in response to the instruction signal $S_1$ to apply other signal pulses $S_o$ to the pulse motor 35 so as to rotate the motor in the forward direction. The motor in turn drives the cutter means 38 along the guide bars 28 and 28' until the cutter means reaches one end of its stroke whereupon the pulse motor control circuit 60 applies reverse direction rotation pulse signals $S_3$ from the reversible pulse signal generator 47. The latter generates signals continuously to the pulse motor 35 to rotate the pulse motor 35 in the reverse direction whereby the cutter means is returned to its initial position.

The preset counter 50 includes a pulse counter circuit 51 adapted to count the number of pulse signals $S_o$, a control value set circuit adapted to set the size of each of glass sections to be cut off the moving continuous glass ribbon in response to a predetermined number of pulse signals and generate an instruction signal $S_1$ when the value which corresponds to the counted number of signal pulses and a conventional zero returning circuit 53 for returning the pulse counter circuit 51 to its zero position after an operation of counting. Portion of the instruction signal $S_1$ from the control value set circuit 52 is applied to the motor control circuit 54 as an ON signal for energizing the circuit 54. Simultaneously, the rest of the instruction signal $S_1$ is applied to a gate circuit 61 of the electrical pulse motor control circuit 60 as an ON signal.

The electric motor control circuit 54 includes a motor's forward direction rotation control circuit 55 having a switch means adapted to connect the motor 15 to the positive polarity side of a power source (not shown) when the switch means is applied thereto the instruction signal $S_1$, a motor's reverse direction rotation control circuit 56 adapted to connect the motor 15 to the negative polarity side of the power source when the circuit 56 is applied thereto the instruction signal $S_1$ and signal generation circuits 57, 58 adapted to generate control signals $S_4$ and $S_5$, respectively, upon the closing of the microswitches 16 and 17. The signal $S_4$ from the signal generation circuit 57 is applied to the forward direction rotation control circuit 55 as OFF signals to deenergize the control circuit 55 while the control signal $S_5$ from the signal generation circuit 58 is applied to the reverse direction rotation control circuit 56 as an OFF signal to deenergize the control circuit 56.

The electrical pulse motor control circuit 60 includes a gate circuit 61 adapted to open its gate upon application of the instruction signal $S_1$ thereto to allow pulse signals $S_o$ to pass therethrough, a forward direction rotation amplifier 62 adapted to amplify the pulse signals which have passed through the gate circuit 67 and apply the amplified pulse signals to the electrical pulse motor 35 as forward direction rotation pulses, a gate circuit 63 adapted to open its gate upon application of the control signal $S_5$ from the signal generation circuit 57 or 58 to allow the reverse direction rotation pulse signals $S_3$ from the variable pulse signal generator 47 to pass therethrough and a reverse direction rotation signal amplifier 64 adapted to amplify the reverse direction rotation pulse signals $S_1$ which have passed through the gate circuit 63 and apply the amplified signals to the pulse motor 35. The control circuit 60 also includes a reversible counter circuit 65 adapted to counter the pulse signals $S_o$ passing through the gate circuit 61 as additive inputs and the reverse direction rotation pulse signals $S_3$ passing through the gate circuit 63 as subtractive inputs, a control value set circuit 66 adapted to apply an OFF signal to the gate circuit 63 when the sum of the additive input value and the subtractive input value is zero and a conventional zero returning circuit adapted to return the reversible counter circuit to its zero position after an operation of the counter circuit. The operation of the above mentioned automatic control system will be described hereinbelow. It is assumed that the apparatus is set in motion and the glass ribbon is being continuously conveyed on the conveyor. When the actuating switch 45 is closed as the cutter mechanism 6 is positioned at one end of the guide rail 7 or in the position A (FIG. 1), the gate circuit 49 is turned to the ON state to permit pulse signals $S_o$ to pass through the circuit. The pulse signals are then applied to the pulse counter circuit 51 of the preset counter where the pulses are counted. When the counter circuit 51 indicates that the counted value of the pulse signals equals to a value at which the counter circuit is preset, the control value set circuit 52 generates an instruction signal $S_1$. The instruction signal $S_1$ energizes the forward direction rotation control circuit 55 of the motor control circuit to rotate the motor 15 in the forward direction whereby the cutter mechanism 6 is slidably moved from the position A toward the position B along the guide rail 7. Simultaneously, the instruction signal $S_1$ also turns the gate circuit 61 of the electric pulse motor control circuit to the ON position which in turn applies pulse signals $S_o$ to the pulse motor 35 to rotate the motor in the forward direction. As a result, while the cutter mechanism 6 is moving along the guide rail 7 in the above-mentioned direction the cutter means 38 on the cutter mechanism is moved along the guide bars 28 and 28' in the same direction and velocity as the glass ribbon 1. In such a case, the pulse signals $S_o$ applied to the pulse motor 35 through the gate circuit 61 are countered as additive inputs in the reversible counter circuit 65. circuit 61 are countered as additive inputs in the reversible counter circuit 65.

When the cutter mechanism 6 reaches the other end of the guide rail 7 or the position B, the microswitch 16 is closed whereupon the OFF signal $S_4$ from the signal generator 57 stops the rotation of the motor 15 thereby to stop the cutter mechanism 6 and simultaneously, the control signal $S_5$ is applied to the gate circuit 61 as an OFF signal to stop the rotation of the pulse motor 35 for the cutter means 38 whereupon the control signal $S_5$ is applied to the gate circuit 63 as an ON signal to open the circuit 63 and the reverse direction rotation pulse $S_3$ from the variable pulse signal generator 47 is applied through the gate circuit 63 to the pulse motor 35 whereupon the pulse $S_3$ is applied to the reversible counter circuit 65 as a subtractive input. As a result, the electrical pulse motor is reversed its rotational direction to drive the cutter mechanism 6 is the reverse direction or from the position B to the position A along the guide rail 7. As the electrical pulse motor 35 is rotated in the reverse direction in the manner mentioned above the cutter means 38 is then moved in the reverse direction along the guide bars 28 and 28'. As the cutter means 38 is moved in the reverse direction when the sum of the additive input value and the subtractive input value becomes zero and OFF signal $S_2$ is applied to the control value set circuit 66 to deenergize the pulse motor 35 to return the cutter means 38 to its initial position. In such a case, since the electrical pulse motor 35 is applied thereto the same number of pulse signals $S_3$ being the reverse direction rotation inputs as that of pulse signals $S_o$ being the forward direction rotation inputs, the cutter means 38 can be precisely returned to its initial position. Thus, one cross-cutting operation on the glass ribbon as instructed by the instruction signal $S_1$ has been completed.

During the above cutting operation, the succeeding pulse signals $S_o$ passing through the gage circuit 49 are counted in the pulse counter circuit 51 in the same manner as the preceding pulse signals $S_o$ and when the counted value of the pulses becomes equal to a length of a glass section to be cut off the continuous glass ribbon, the control value set circuit generates a new instruction signal $S_1$ to be applied to the electric motor control circuit 54 and electric motor pulse control circuit 60. As a result, the reverse direction rotation control circuit 56 is energized to rotate the motor 15 in the reverse direction whereby the cutter mechanism 6 is moved in the reverse direction along the guide rail 7 and simultaneously, the gate circuit 61 is turned on to rotate the pulse motor 35 in the forward direction whereby to move the arm member 36. Accordingly, the cutter means 38 is moved in the advancing direction of the glass ribbon along the guide bars 28 and 28' to initiate a next cross-cut off the glass ribbon. When the second cross-cutting operation by the cutter means 38 has been completed, the microswitch 17 is closed to stop the rotation of the motor 15 in the reverse direction thereby to retain the cutter mechanism 6 in the position A whereupon the rotation of the electrical pulse motor 35 in the forward direction is stopped. Immediately after the stoppage of the pulse motor 35 in the forward direction, the motor is then rotated in the reverse direction to rapidly return the cutter means 38 to its initial position. Thus, a single reciprocal movement of the cutter mechanism 6 across the glass ribbon performs the cross-cutting operation two times. When the above procedure is repeated, successive glass sections having a predetermined size are cross-cut off the continuous glass ribbon in a continuous and effective manner.

In the illustrated embodiment, the size of glass products or sections to be cut off the continuous glass ribbon may be varied within a substantially wide range by varying the set value for the control value set circuit 52 in the preset counter 50. The movement velocity of the cutter mechanism 6 can be easily selected to a value most suitable for a particular cross-cutting operation independently of the advancing velocity of the glass ribbon by providing suitable conventional rotational speed control means for controlling the rotational speed of the electric motor 15 which is selectively connected to the forward direction rotation control circuit 55 and the reverse direction rotation control circuit 56. In addition, the rotational speed of the electrical pulse motor 35 can be adjusted by adjusting the frequency of reverse rotation pulse signals $S_3$ from the pulse signal generator 47 and accordingly, the movement velocity of the cutter means 38 to its initial position can be easily set to a desirable high value.

In the foregoing, although description has been made of one particular embodiment of the invention which is considered as the preferable at present time, it will be readily appreciated by those skilled in the art that the same is for illustration purpose only and is not to be taken as a definition of the invention, reference being had for this purpose to the appended claims.

What we claim is:

1. In an apparatus for automatically cutting a continuous moving glass ribbon being conveyed on a conveyor in an advancing direction, said apparatus comprising a guide rail disposed above said conveyor extending across the conveyor at substantially right angles thereto; a cutter mechanism mounted on said guide rail for reciprocal movement from one end to the other end and vice versa and having cutter means mounted thereon, said cutter means being adapted to move together with said cutter mechanism and also to move transversely and independently of the cutter mechanism in said advancing direction and the opposite direction, respectively; an electric motor for driving said cutter mechanism; a pair of guide bars for guiding said cutter means in said advancing direction and opposite direction; drive means including an electrical pulse motor mounted on said cutter mechanism for driving said cutter means in said advancing direction at the same velocity as said glass ribbon and in said opposite direction at a higher velocity; a pulse signal generator for detecting said advancing velocity of the glass ribbon and converting said detected advancing velocity into pulse signals; and an electrical control means for controlling said electric motor which drives said cutter mechanism and said electrical pulse motor which drives said cutter means.

2. An automatic glass ribbon cutting apparatus as set forth in claim 1, in which said cutter mechanism comprises a carriage supported on said guide rail for slidable movement along the rail and having legs depending from the underside of the carriage and slidably fitted on the rail.

3. An automatic glass ribbon cutting apparatus as set forth in claim 1, in which said guide rail is disposed above said conveyor extending across the conveyor at substantially right angles to the latter and provided with two microswitches at the opposite ends of the guide rail adjacent to the opposite edges of said moving glass ribbon, said microswitches being adapted to close their contacts when said cutter mechanism reaches the position of these microswitches.

4. An automatic glass ribbon cutting apparatus as set forth in claim 1, in which said cutter mechanism comprises a pair of parallel and spaced guide bars extending transversely of said guide rail with one ends fixedly secured to said carriage and the other ends extending beyond the adjacent side of the guide rail and a movable arm member for supporting said cutter means having the opposite ends slidably received on said pair of guide bars.

5. An automatic glass ribbon cutting apparatus as set forth in claim 1, in which said cutter mechanism further comprises a ball screw disposed between and spaced from said pair of guide bars in a parallel relation to the bars and a ball nut threaded on said screw to which said movable arm member is fixedly secured whereby said cutter means is moved along said guide bars as said ball screw is turned along the ball screw.

6. An automatic glass ribbon cutting apparatus as set forth in claim 1, in which said ball screw is journalled at their extending thread ends in the center of a connecting bar which connects between said guide bars and rotatably supported in their non-threaded portions in support brackets secured to and extending uprightly from said carriage, said ball screw having at the extreme end of said non-threaded end portion a gear secured thereto in engagement with a pinion at the adjacent end of said electrical pulse motor on said carriage.

7. An automatic glass ribbon cutting apparatus as set forth in claim 1, in which said automatic control means comprises a gate circuit for controlling the passage therethrough of said pulse signals from said pulse signal generator, a preset counter for counting the number of pulse signals passing through said gate circuit and generating an instruction signal when the counter counts a predetermined number of pulse signals, an electric motor control circuit adapted to be energized upon application of said instruction signal thereto to rotate the electric motor in the forward or reverse direction, and an electrical pulse motor control circuit adapted to be energized upon application of said instruction signal to firstly rotate the pulse motor in the forward direction and then rotate the pulse motor in the reverse direction at a higher speed.

8. An automatic glass ribbon cutting apparatus as set forth in claim 7, in which said preset counter comprises a pulse counter circuit for counting the number of said pulse signals passing through said gate circuit, a control value set circuit adapted to generate an instruction signal when the number of said pulse signals reaches a predetermined number representing a predetermined size of glass product to be cut off said continuous glass ribbon and a zero return circuit for returning said pulse counter circuit to its zero position.

9. An automatic glass ribbon cutting apparatus as set forth in claim 7, in which said electric motor control circuit includes a forward direction rotation control circuit adapted to be energized upon application of said instruction signal thereto to rotate said motor for the cutter mechanism in the forward direction, a first signal generation circuit adapted to apply an OFF signal to said forward direction rotation control circuit at the closure of one of said microswitches, and a second signal generation circuit adapted to be energized upon closure of the other one of said microswitches to apply an OFF signal to said reverse direction rotation control circuit, each of said first and second signal generation circuits including a circuit which applies portion of a control signal to said electrical pulse control circuit.

10. An automatic glass ribbon cutting apparatus as set forth in claim 7, in which said electrical pulse control includes a first gate circuit adapted to open its gate upon application of an insgruction signal from said preset counter thereto so as to permit pulse signals to pass therethrough and to close said gate upon alternate application of a control signal from said first and second signal generation circuits so as to obstruct passage of said pulse signals therethrough, a forward direction rotation amplifier adapted to amplify said pulse signals which passed through said first gate circuit and apply the amplified signals to said electrical pulse motor, a reversible counter circuit adapted to said pulse signals which have passed through said first gate circuit as additive inputs, a variable pulse signal generator adapted to generate reverse direction rotation pulses for rotating said electrical pulse motor in the reverse direction; a second gate circuit adapted to open its gate upon application of a control signal so as to permit said reverse direction rotation pulse signals to pass therethrough, a reverse direction rotation amplifier adapted to amplity said reverse direction rotation pulses which have passed through said second gate circuit and to apply said amplified pulses to said electrical pulse motor, a control value set circuit adapted to apply said reverse direction rotation pulses as substractive inputs to said reversible counter circuit and apply an OFF signal to said second gate circuit when the sum of said additive and substractive input signals counted in said reversible counter circuit becomes zero and a zero return circuit adapted to return said reversible counter circuit to the zero position.

* * * * *